United States Patent
Inoue et al.

(10) Patent No.: US 9,829,676 B2
(45) Date of Patent: Nov. 28, 2017

(54) IMAGING DEVICE AND FOCUSING CONTROL METHOD

(71) Applicant: FUJIFILM Corporation, Tokyo (JP)

(72) Inventors: Kazuki Inoue, Saitama (JP); Yasuo Ohtsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/214,714

(22) Filed: Jul. 20, 2016

(65) Prior Publication Data

US 2016/0327771 A1    Nov. 10, 2016

Related U.S. Application Data

(63) Continuation of application No. PCT/JP2014/079207, filed on Nov. 4, 2014.

(30) Foreign Application Priority Data

Feb. 13, 2014  (JP) .................................. 2014-025555

(51) Int. Cl.
*H04N 5/232* (2006.01)
*G02B 7/28* (2006.01)
(Continued)

(52) U.S. Cl.
CPC .............. *G02B 7/285* (2013.01); *G02B 7/34* (2013.01); *G02B 7/365* (2013.01);
(Continued)

(58) Field of Classification Search
CPC .......... G02B 7/285; G02B 7/34; G02B 7/365; H04N 5/23212; H04N 5/3696; H04N 5/378; H04N 9/045
(Continued)

(56) References Cited

U.S. PATENT DOCUMENTS

| 8,730,380 B2 * | 5/2014 | Uchida | .................. G03B 13/36 348/345 |
|---|---|---|---|
| 2010/0150538 A1 | 6/2010 | Ono et al. | |

(Continued)

FOREIGN PATENT DOCUMENTS

| JP | 2010-139942 A | 6/2010 |
|---|---|---|
| JP | 2010-152161 A | 7/2010 |

(Continued)

OTHER PUBLICATIONS

International Search Report for PCT/JP2014/079207 mailed on Feb. 17, 2015.
(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

The present invention provides an imaging device and a focusing control method capable of performing reliability determination of a phase difference AF at high speed. A phase difference AF processing unit (19) performs a correlation operation with respect to detection signal groups in first pairs P1, and performs a correlation operation with respect to detection signal groups in second pairs P2. A system control unit (11) compares a difference between a first correlation amount M1 which is a minimum correlation amount between the detection signal groups in the first pairs P1, among obtained results of the correlation operation with respect to the first pairs P1 and a second correlation amount M2 which is a minimum correlation amount between the detection signal groups in the second pairs P2, among obtained results of the correlation operation with respect to the second pairs P2 with a threshold value TH, to thereby determine a reliability of a focusing control based on the phase difference AF method.

9 Claims, 15 Drawing Sheets

(51) Int. Cl.
*G02B 7/34* (2006.01)
*H04N 9/04* (2006.01)
*G02B 7/36* (2006.01)
*H04N 5/378* (2011.01)
*H04N 5/369* (2011.01)

(52) U.S. Cl.
CPC ....... *H04N 5/23212* (2013.01); *H04N 5/3696* (2013.01); *H04N 5/378* (2013.01); *H04N 9/045* (2013.01); *H04N 2209/043* (2013.01)

(58) Field of Classification Search
USPC .................. 348/345, 348, 349, 353–356
See application file for complete search history.

(56) References Cited

U.S. PATENT DOCUMENTS

| | | | | |
|---|---|---|---|---|
| 2013/0308040 | A1* | 11/2013 | Ishii | ............... H04N 5/3696 348/353 |
| 2014/0211059 | A1 | 7/2014 | Aoki | |
| 2014/0347549 | A1* | 11/2014 | Nakamoto | ............... G02B 7/36 348/349 |
| 2015/0085178 | A1* | 3/2015 | Aoki | ............... H04N 5/23212 348/349 |
| 2016/0156836 | A1* | 6/2016 | Aoki | ............... G02B 7/34 348/345 |

FOREIGN PATENT DOCUMENTS

| | | |
|---|---|---|
| JP | 2010-204294 A | 9/2010 |
| WO | 2013/047160 A1 | 4/2013 |

OTHER PUBLICATIONS

Written Opinion of the International Searching Authority for PCT/JP2014/079207 mailed on Feb. 17, 2015.

English Translation of International Preliminary Report on Patentability for PCT/JP2014/079207 (including PCT/IB/373 and PCT/ISA/237), issued on Aug. 16, 2016.

* cited by examiner

IMAGING DEVICE AND FOCUSING CONTROL METHOD

CROSS-REFERENCE TO RELATED APPLICATIONS

This application is a Continuation of PCT International Application No. PCT/JP2014/079207 filed on Nov. 4, 2014, which claims priority under 35 U.S.C. §119(a) to Japanese Patent Application No. 2014-025555 filed on Feb. 13, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a contrast auto-focus (AF) method or a phase difference AF method (for example, WO2013-047160A and JP2010-152161A) is employed. Since the contrast AF method and the phase difference AF method have respective advantages, an imaging device that uses both of the advantages has also been proposed (for example, JP2010-139942A and JP2010-204294A).

It is known that in a case where a focusing control based on the phase difference AF method is performed using an imaging element in which phase difference detection pixels are discretely arranged in an imaging surface, in a case where a high frequency part is present in a captured subject image, the reliability of the focusing control is reduced. Thus, in JP2010-204294A, it is determined whether a periodic pattern is present in a subject from frequency analysis of imaging pixels, and in a case where a periodic pattern is present, the focusing control based on a contrast AF method instead of the phase difference AF method is performed.

SUMMARY OF THE INVENTION

As disclosed in JP2010-204294A, when determining the reliability of the focusing control based on the phase difference AF method using detection signals of imaging pixels, since it takes time for frequency analysis, the time until focusing on a main subject is achieved becomes long.

In order to solve the above-mentioned problems, an object of the invention is to provide an imaging device and a focusing control method capable of determining a reliability of a focusing control based on a phase difference AF method at high speed.

According to an aspect of the invention, an imaging device includes: an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a focusing control unit that performs a focusing control for the imaging optical system based on a phase difference AF method using a phase difference obtained with a detection signal of the first signal detection unit and a detection signal of the second signal detection unit; a correlation operation unit that performs a correlation operation with respect to detection signal groups in first pairs that include a first signal detection unit group including the plurality of the first signal detection unit which are arranged at an arbitrary pitch in a phase difference detection direction and a second signal detection unit group including the plurality of the second signal detection unit which are arranged at the same distance in the same direction with respect to each of the first signal detection units that form the first signal detection unit group and performs a correlation operation with respect to detection signal groups in second pairs that include a third signal detection unit group including the plurality of first signal detection units which are arranged at the same distance in the same direction with respect to each of the first signal detection units that form the first signal detection unit group and are arranged in the detection direction and a fourth signal detection unit group including the plurality of second signal detection units which are arranged at the same distance in the same direction with respect to each of the first signal detection units that form the third signal detection unit group; a reliability determination unit that determines a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a phase difference AF determination unit that determines whether to perform the focusing control based on the phase difference AF method based on a determination result in the reliability determination unit.

According to another aspect of the invention, a focusing control method includes: a focusing control step of performing a focusing control for an imaging optical system based on a phase difference AF method using a phase difference obtained with a detection signal of a first signal detection unit and a detection signal of a second signal detection unit output from an imaging element that includes the first signal detection unit that detects a signal corresponding to one beam among a pair of beams that passes through different portions in a pupil region of the imaging optical system and the second signal detection unit that detects a signal corresponding to the other beam among the pair of beams and images a subject through the imaging optical system; a correlation operation step of performing a correlation operation with respect to detection signal groups in first pairs that include a first signal detection unit group including the plurality of the first signal detection unit which are arranged at an arbitrary pitch in a phase difference detection direction and a second signal detection unit group including the plurality of the second signal detection unit which are arranged at the same distance in the same direction with respect to each of the first signal detection units that form the first signal detection unit group and performing a correlation operation with respect to detection signal groups in second pairs that include a third signal detection unit group including the plurality of first signal detection units which are arranged at the same distance in the same direction with respect to each of the first signal detection units that form the first signal detection unit group and are arranged at the arbitrary pitch in the detection direction and a fourth signal detection unit group including the plurality of second signal detection units which are arranged at the same distance in the same direction with respect to each of the first signal detection units that form the third signal detection unit group; a reliability determination step of determining a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a determination step of determining whether to perform the focusing control by the phase difference AF method based on a determination result in the reliability determination step.

According to the invention, it is possible to provide an imaging device and a focusing control method capable of determining a reliability of the focusing control based on the phase difference AF method at high speed.

DESCRIPTION OF THE PREFERRED EMBODIMENTS

Hereinafter, embodiments of the invention will be described with reference to the accompanying drawings.

Figure 1:
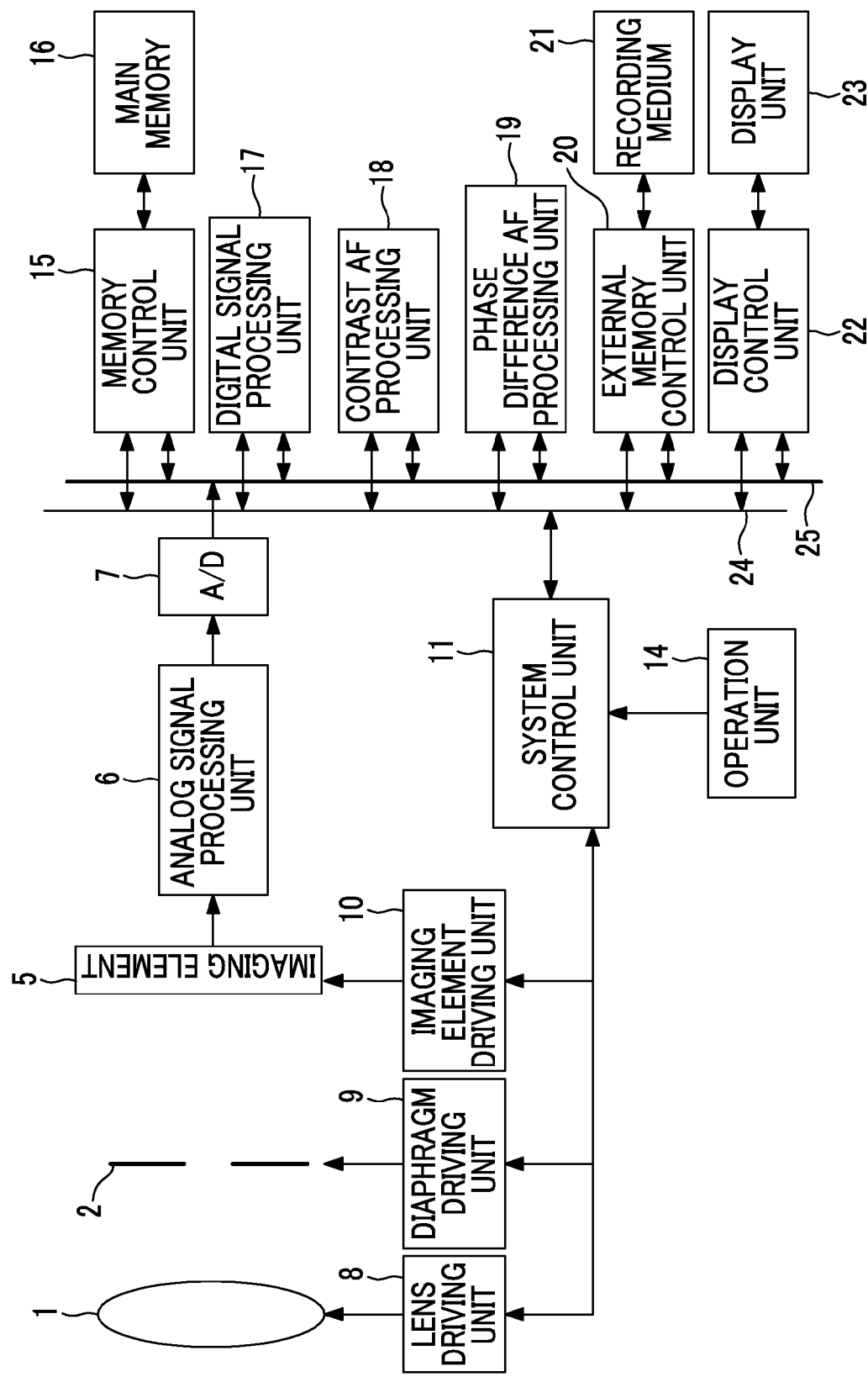
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 comprises a lens device that includes an imaging lens 1 including a focus lens, a zoom lens, or the like and a diaphragm 2. The lens device forms an imaging optical system. The lens device may be detachably and attachably provided in a camera main body, or may be fixed thereto. The imaging lens 1 may include at least the focus lens. The focus lens may be the entirety of an imaging lens, or may be a part of an imaging lens that includes plural lenses.

The camera main body comprises an imaging element 5 of a CCD type, a CMOS type, or the like that images a subject through the lens device, an analog signal processing unit 6 that is connected to an output end of the imaging element 5 and performs analog signal processing such as a correlated double sampling process or the like, and an A/D conversion circuit 7 that converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera controls the lens driving unit 8 to adjust the position of the focus lens included in the imaging lens 1 or to adjust the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 to the imaging element 5 as a captured image signal. An instruction signal from a user is input to the system control unit 11 through an operation unit 14.

Further, as described later, the system control unit 11 selects any one of a contrast AF processing unit 18 and a phase difference AF processing unit 19, and performs a focusing control of the imaging lens 1 according to a focusing position determined by the selected processing unit. And the system control unit 11 functions as a focusing control unit.

Further, the electric control system of the digital camera includes a main memory 16, a memory control unit 15 connected to the main memory 16, a digital signal processing unit 17, the contrast AF processing unit 18, the phase difference AF processing unit 19, an external memory control unit 20 to which a detachable and attachably recording medium 21 is connected, and a display control unit 22 to which a display unit 23 mounted on a rear surface or the like of the camera is connected. The digital signal processing unit 17 generates captured image data by performing an interpolation operation, a gamma correction operation, a RGB/YC conversion process, and the like with respect to a captured image signal output from the A/D conversion circuit 7. The contrast AF processing unit 18 determines a focusing position according to a contrast AF method. The phase difference AF processing unit 19 determines a focusing position according to a phase difference AF method.

The memory control unit 15, the digital signal processing unit 17, the contrast AF processing unit 18, the phase difference AF processing unit 19, the external memory control unit 20, and the display control unit 22 are connected to each other through a control bus 24 and a data bus 25, and are controlled by instructions from the system control unit 11.

Figure 2:
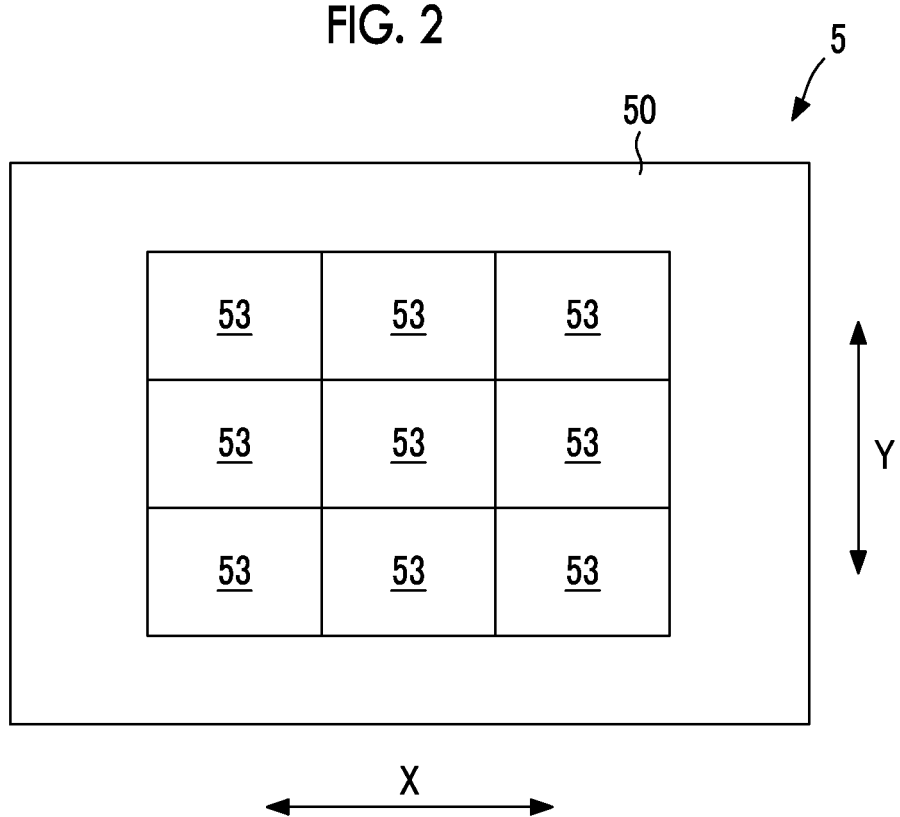
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes a light receiving surface 50 on which multiple pixels which are arranged in a two-dimensional pattern in a row direction X and in a column direction Y orthogonal to the row direction X. In the example of FIG. 2, nine AF areas 53 which are target areas for focusing are provided on the light receiving surface 50.

The AF area 53 is an area that includes an imaging pixel and a phase difference detection pixel as pixels.

In a portion where the AF areas 53 are excluded on the light receiving surface 50, only imaging pixels are disposed. The AF areas 53 may be provided on the light receiving surface 50 without a gap.

Figure 3:
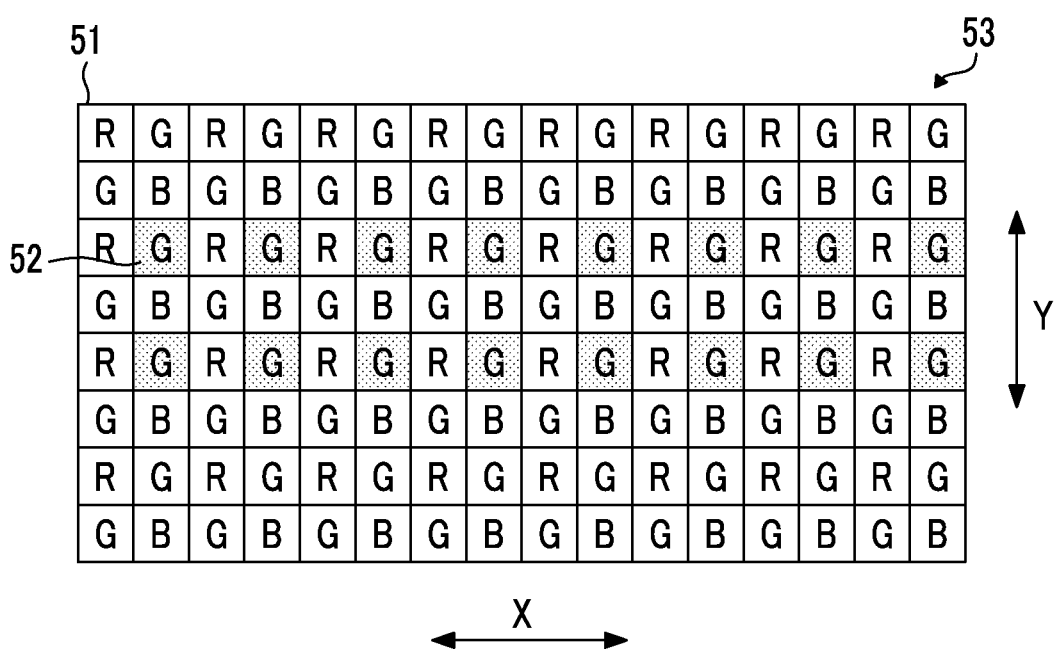
FIG. 3 is a partially enlarged view illustrating a single AF area 53 shown in FIG. 2.

FIG. 3 is a partially enlarged view illustrating a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the light receiving surface 50.

In the AF area 53, a part of the G pixels 51 (shaded pixels 51 in FIG. 3) are used as the phase difference detection pixels (reference number 52 is assigned thereto). In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixels 52.

Figure 4:
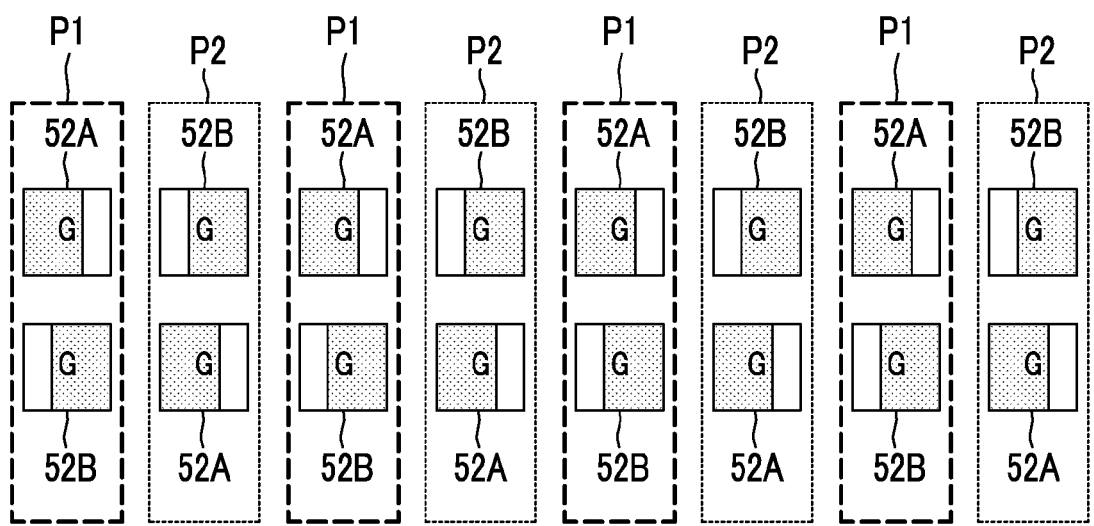
FIG. 4 is a diagram illustrating only a phase difference detection pixel 52 shown in FIG. 3.

FIG. 4 is a diagram illustrating a case where the phase difference detection pixels 52 shown in FIG. 3 are extracted.

As shown in FIG. 4, the phase difference detection pixels 52 include two types of pixels which are phase difference detection pixels 52A and phase difference detection pixels 52B.

The phase difference detection pixel 52A is a first signal detection unit that receives one beam among a pair of beams that passes through different portions in a pupil region of the imaging lens 1 and detects a signal depending on the intensity of received light.

The phase difference detection pixel 52B is a second signal detection unit that receives the other beam among the pair of beams and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A. Further, the center of the opening (white portion in FIG. 4) of the phase difference detection pixel 52B is eccentric leftward with respect to the center of the photoelectric conversion unit of the phase difference detection pixel 52B.

With such a configuration, it is possible to detect, using a pixel group that includes the phase difference detection pixels 52A which are disposed in an arbitrary row and a pixel group that includes the phase difference detection pixels 52B which are disposed at the same distance in the same direction with respect to the respective phase difference detection pixels 52A of the former pixel group, a phase difference in the row direction X in images respectively captured by respective pixel of the two pixel groups.

As shown in FIG. 4, in the AF area 53, at least one pair line in which a pixel pair P1 that includes the phase difference detection pixel 52A and the phase difference detection pixel 52B which are disposed at a predetermined distance with respect to the phase difference detection pixel 52A in a direction orthogonal to the phase difference detection direction (row direction X) and a pixel pair P2 having a reverse positional relationship with respect to the positional relationship of the phase difference detection pixel 52A and the phase difference detection pixel 52B in the pixel pair P1 are alternately disposed in the X direction is provided.

All the pixel pairs P1 included in a pair line forms a first pair of a first signal detection unit group including the plural phase difference detection pixels 52A which are arranged at an arbitrary pitch (distance corresponding to four pixels) along the phase difference detection direction and a second signal detection unit group including the phase difference detection pixels 52B which are arranged at the same distance (distance corresponding to two pixels) in one direction (downward direction) with respect to the respective phase difference detection pixels 52A of the first signal detection unit group.

All the pixel pairs P2 included in a pair line forms a second pair of a third signal detection unit group including the plural phase difference detection pixels 52A which are arranged at the same distance in one direction (on a diagonally lower right side) with respect to the respective phase difference detection pixels 52A of the first signal detection unit group and are arranged along the detection direction and a fourth signal detection unit group including the phase difference detection pixels 52B which are arranged at the same distance (distance corresponding to two pixels) in an upward direction with respect to the respective phase difference detection pixels 52A of the third signal detection unit group.

The phase difference AF processing unit 19 shown in FIG. 1 calculates a phase difference amount which is a relative position deviation amount of two images formed by the pair of beams using detection signal groups read from the phase difference detection pixels 52A and the phase difference detection pixels 52B disposed in one AF area 53 selected by a user operation or the like from nine AF areas 53.

The phase difference AF processing unit 19 performs a correlation operation with respect to detection signal groups of the phase difference detection pixels 52A and the phase difference detection pixels 52B of the pixel pairs P1 that form one pair line in the selected one AF area 53, and a correlation operation between detection signal groups of the phase difference detection pixels 52A and the phase difference detection pixels 52B of the pixel pairs P2 that form one pair line in the selected one AF area 53. The phase difference AF processing unit 19 functions as a correlation operation unit.

Specifically, when data on one detection signal group is represented as "A[1], . . . , and A[k]" and data on the other detection signal group is represented as "B[1], . . . , and B[k]", an area C[d] surrounded by waveforms of the two sets of data calculated by the following expression when the two sets of data are deviated by a shift amount "d" is calculated as a correlation amount of the two detection signal groups. As the correlation amount becomes smaller, a matching rate of the waveforms of the two sets of data becomes higher.

$$C[d] = \sum_{n=1}^{k} (A[n+d] - B[n])^2 \quad (1)$$

$$d = -L, \ldots, -2, -1, 0, 1, 2, \ldots, L$$

Hereinafter, the result of the correlation operation of the detection signal groups of the phase difference detection pixels 52A and the phase difference detection pixels 52B of the pixel pairs P1 is represented as C1[d]. Further, the result of the correlation operation of the detection signal groups of the phase difference detection pixels 52A and the phase difference detection pixels 52B of the pixel pairs P2 is represented as C2[d].

The phase difference AF processing unit 19 sets a value of the shift amount d when C1[d] becomes a minimum or a value of the shift amount d when C2[d] becomes a minimum as a phase difference amount. Further, the phase difference AF processing unit 19 calculates a focus adjustment state of the imaging lens 1 based on the phase difference amount. Here, the phase difference AF processing unit 19 calculates a deviation amount from a focused state, that is, a defocus amount. The phase difference AF processing unit 19 determines a focusing position of the focus lens from the defocus amount.

The contrast AF processing unit 18 shown in FIG. 1 analyzes an image captured by one AF area 53 selected by a user operation or the like from nine AF areas 53, and determines a focusing position of the imaging lens 1 according to a known contrast AF method.

That is, the contrast AF processing unit 18 calculates a contrast (brightness difference) of an image obtained at respective movement positions (plural positions) while moving the position of the focus lens of the imaging lens 1 under the control of the system control unit 11. Thus, the contrast AF processing unit 18 determines the position of the focus lens where the contrast becomes a maximum as the focusing position.

Instead of one AF area 53, plural AF areas 53 which are continuously arranged may be selected.

In the digital camera of this embodiment, as there is an instruction for performing auto-focus, thereby the system control unit 11 performs a focusing control based on the phase difference AF method or a focusing control based on the contrast AF method. Here, the system control unit 11 determines reliability of the focusing control based on the phase difference AF method, and determines whether to perform the focusing control based on the phase difference AF method based on the determined reliability. For example, the system control unit 11 performs the focusing control based on the phase difference AF method in the case that the reliability is high, and performs the focus control based on the contrast AF method in the case that the reliability is low. And the system control unit 11 functions as a phase difference AF determination unit.

Figure 5A:
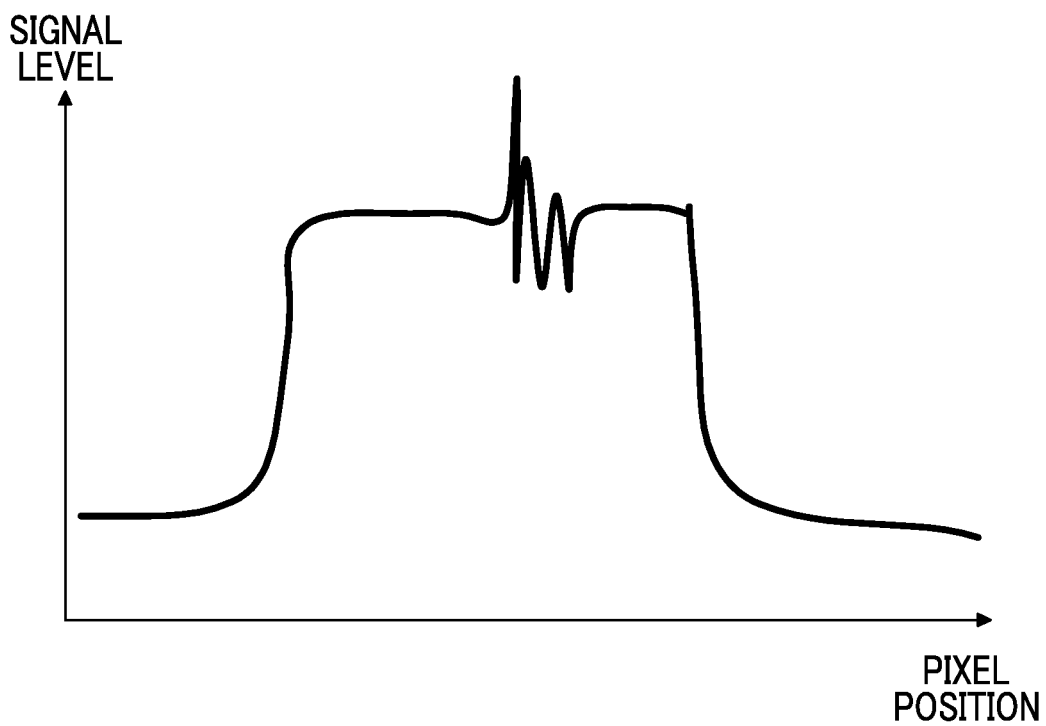
FIGS. 5A and 5B are diagrams illustrating waveforms of detected signals of a phase difference detection pixel group when a high frequency part is included in a subject image.
Figure 5B:
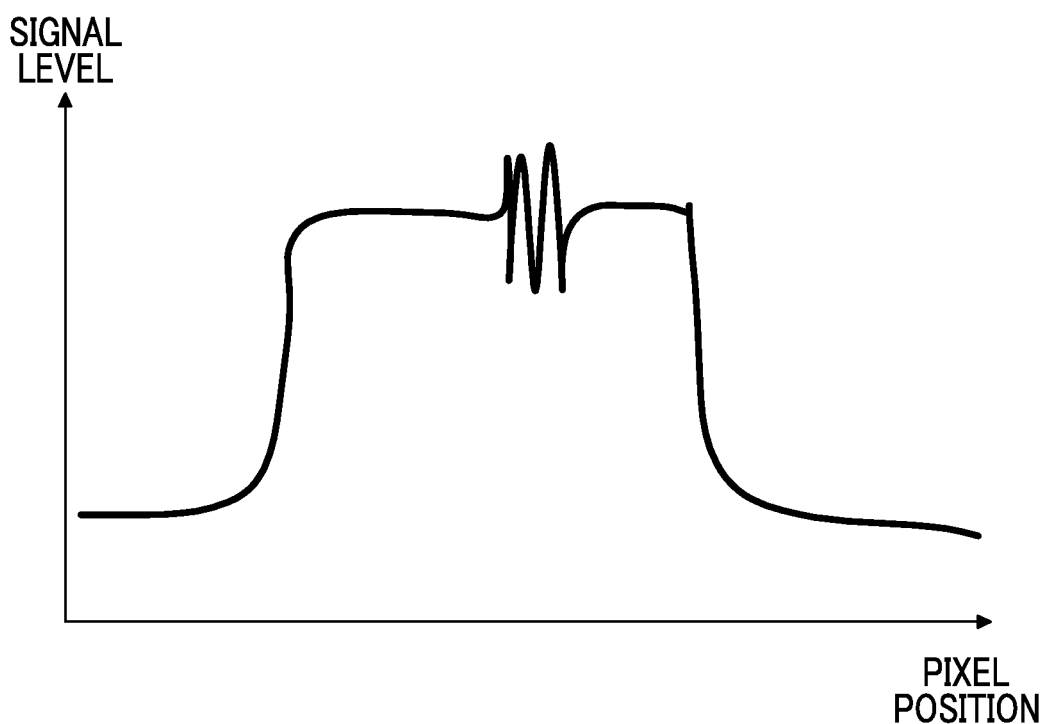

FIG. 5A is a diagram illustrating an example of detection signals of the respective phase difference detection pixels 52A of the pixel pair P2. FIG. 5B is a diagram illustrating an example of detection signals of the respective phase difference detection pixels 52B of the pixel pair P2.

Since each phase difference detection pixel 52A of the pixel pair P2 and each phase difference detection pixel 52B of the pixel pair P2 are arranged with being apart from each other by merely two pixels in the column direction Y, they capture approximately the same subject images. However, in the case that a high frequency part is locally present in a subject image formed in the pixel pair P2, as shown in FIG. 5, a detection signal waveform of the respective phase difference detection pixels 52A of the pixel pair P2 and a detection signal waveform of the respective phase difference detection pixels 52B of the pixel pair P2 approximately match each other at a low frequency part, but have different shapes in the high frequency part.

Figure 6:
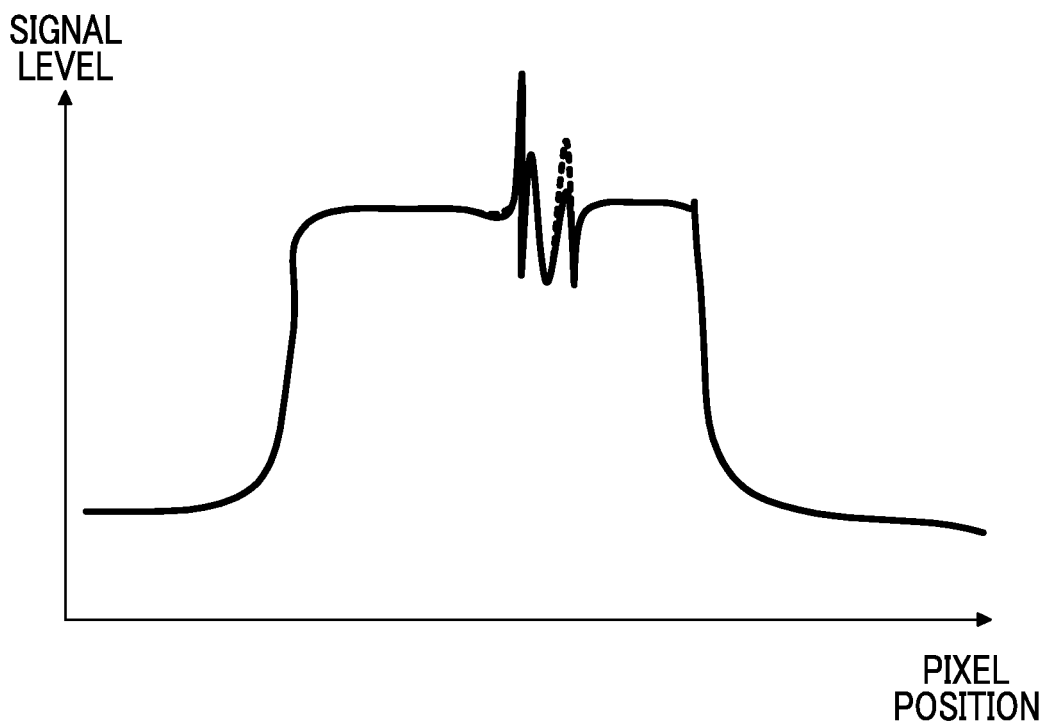
FIG. 6 is a diagram illustrating a waveform positional relationship when a correlation amount becomes a minimum in the waveforms shown in FIGS. 5A and 5B.

The phase difference AF processing unit 19 shifts the waveform shown in FIG. 5A and the waveform shown in FIG. 5B in column direction, and calculates a correlation amount C2[d] which represents an area surrounded by two waveforms at each shifted position. FIG. 6 shows a positional relationship between the waveform shown in FIG. 5A and the waveform shown in FIG. 5B when the value of C2[d] becomes a minimum. As shown in FIG. 6, even if the value of C2[d] becomes a minimum, a matching rate of two data waveforms is low in the high frequency part (a part where a signal level is finely changed in the figure).

With respect to the pixel pair 1, similarly, in the case that a high frequency part is locally present in a subject image formed in the pixel pair P1, a detection signal waveform of the respective phase difference detection pixels 52A of the pixel pair P1 and a detection signal waveform of the respective phase difference detection pixels 52B of the pixel pair P1 approximately match each other at a low frequency part, but have different shapes in the high frequency part. Accordingly, even if the value of C1[d] calculated by the phase difference AF processing unit 19 becomes a minimum, a matching rate of two data waveforms becomes low in the high frequency part.

In this way, in the case that the phase difference amount is determined in a state where a part of which the matching rate is low is included in two detection signal groups, there is a possibility that erroneous focusing occurs when the focusing control is performed based on the phase difference amount.

Figure 7:
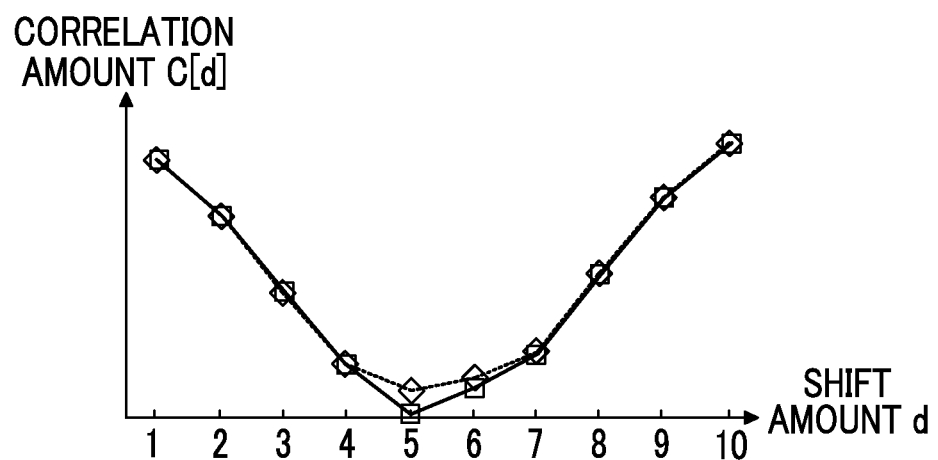
FIG. 7 is a diagram illustrating correlation operation results of respective pixel pairs P1 and P2 when a high frequency part is included in the subject image.

FIG. 7 is a diagram illustrating correlation operation results of the respective pixel pairs P1 and P2 when a local high frequency part is included in a subject image captured by the pixel pairs P1 and P2. A graph indicated by a solid line in FIG. 7 represents the correlation operation result C1[$d$] of the pixel pair P1, and a graph indicated by a broken line in FIG. 7 represents the correlation operation result C2[$d$] of the pixel pair P2.

Since the respective pixels of the pixel pair P1 and the respective pixels of the pixel pair P2 are closely arranged, the pixel pair P1 and the pixel pair P2 capture approximately the same subject images. Thus, as shown in FIG. 7, even in a case where a local high frequency part is included in the subject images captured by the pixel pairs P1 and P2, the shapes of C1[$d$] and C2[$d$] approximately match each other as a whole. However, as described above, in a portion where a correlation amount becomes a minimum, a great difference occurs between C1[$d$] and C2[$d$] due to a difference of images in the high frequency part.

Here, it may be considered that a high frequency part is formed in only one of the pixel pair P1 and the pixel pair P2. However, in this case, since one of the minimum value of C1[$d$] and the minimum value of C2[$d$] becomes smaller and the other thereof becomes larger, a great difference is present therebetween.

From this review, the inventors found that in a case where a great difference occurs in the minimum value of C1[$d$] and the minimum value of C2[$d$], it is possible to determine that a high frequency part is included in the subject images captured by the pixel pair P1 and P2.

Thus, in the digital camera shown in FIG. 1, as there is an auto-focus instruction, the system control unit 11 causes the phase difference AF processing unit 19 to calculate C1[$d$] and C2[$d$], and compares a minimum value of the obtained C1[$d$] with a minimum value of the obtained C2[$d$]. The system control unit 11 calculates a difference between two minimum values as a result of comparison between the minimum value of C1[$d$] and the minimum value of C2[$d$]. In the case that the difference is larger than a threshold value TH, the system control unit 11 determines that the reliability of the focusing control based on the phase difference AF method using the detection signals of the pixel pairs P1 and P2 is low. Further, in a case where the difference is equal to or smaller than the threshold value TH, the system control unit 11 determines that the reliability of the focusing control based on the phase difference AF method using the detection signals of the pixel pairs P1 and P2 is high. Thus, it is possible to perform the focusing control with high accuracy. The system control unit 11 functions as a reliability determination unit.

Hereinafter, an auto-focus operation of the digital camera shown in FIG. 1 will be described.

Figure 8:
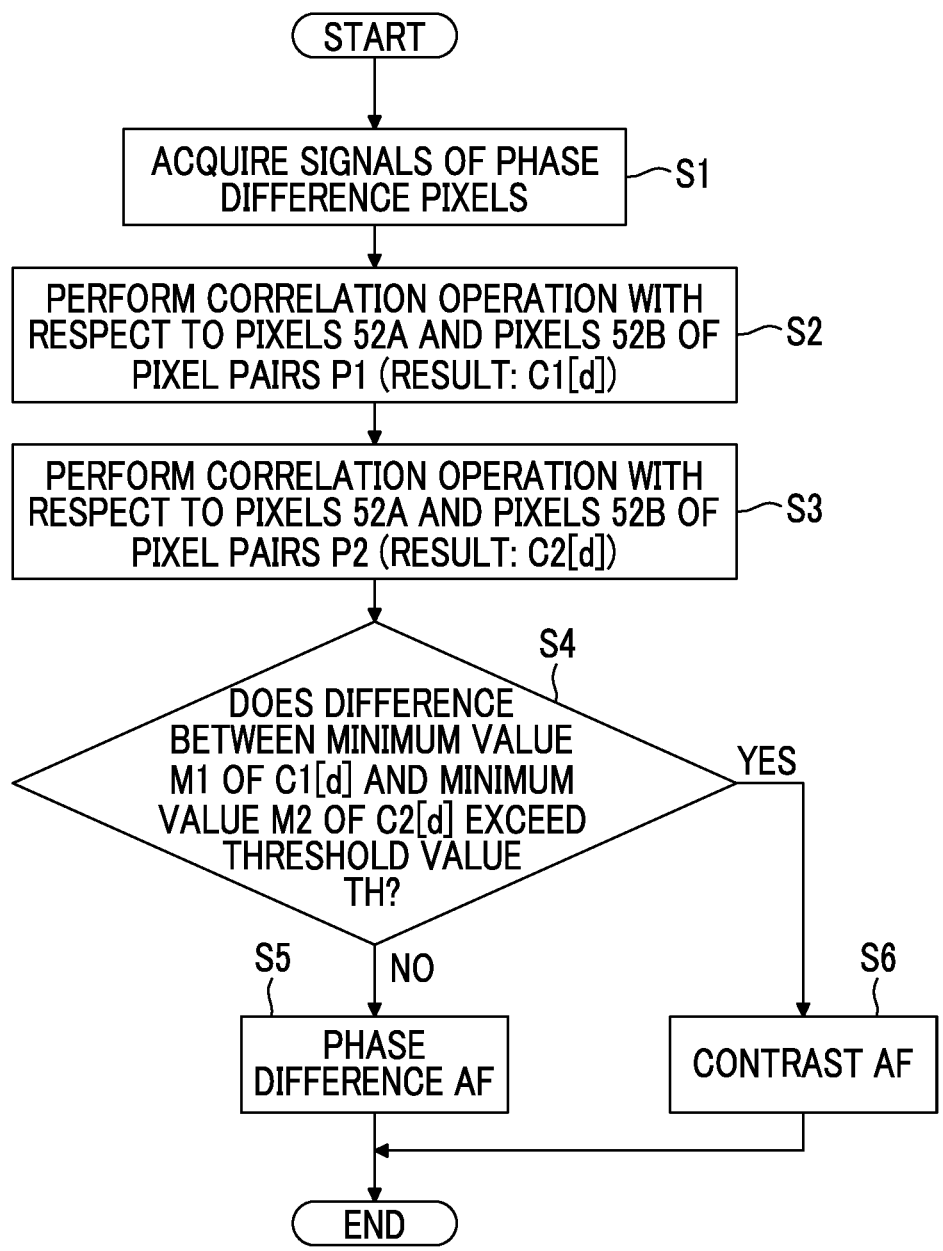
FIG. 8 is a flowchart illustrating an auto-focus operation of the digital camera shown in FIG. 1.

FIG. 8 is a flowchart illustrating the auto-focus operation of the digital camera shown in FIG. 1.

If an auto-focus instruction is input to the system control unit 11 through a half pressing operation or the like of a shutter button, first, the phase difference AF processing unit 19 acquires detection signals of the phase difference detection pixels 52A and the phase difference detection pixels 52B disposed in a selected AF area 53 (step S1).

Then, the phase difference AF processing unit 19 performs a correlation operation with respect to detection signal groups of the phase difference detection pixels 52A and the phase difference detection pixels 52B of the pixel pairs P1 that form one pair line among the acquired detection signals (step S2). A result of the correlation operation in step S2 is C1[$d$].

Subsequently, the phase difference AF processing unit 19 performs a correlation operation with respect to detection signal groups of the phase difference detection pixels 52A and the phase difference detection pixels 52B of the pixel pairs P2 that form the one pair line among the acquired detection signals (step S3). A result of the correlation operation in step S3 is C2[$d$].

Then, the system control unit 11 calculates a difference (an absolute value) between a minimum value M1 of C1[$d$] calculated in step S2 and a minimum value M2 of C2[$d$] calculated in step S3, and determines whether the difference exceeds the threshold value TH (step S4).

If $|M1-M2| \leq TH$ (step S4: NO), the system control unit 11 determines that the reliability of the focusing control based on the phase difference AF method is high, and performs a process of step S5.

Here, M1 and M2 respectively represent the minimum values of C1[$d$] and C2[$d$], but an approximation function due to a known quadratic function or the like may be calculated using the correlation value C1[$d$] as a function of the shift amount d, and minimum values of the approximation function may be represented as M1 and M2. In this case, the shift amount d in which the correlation value becomes the minimum may be a small value. Further, the shift amounts in which C1[$d$] and C2[$d$] become the minimum may have different values.

In step S5, the system control unit 11 selects the phase difference AF processing unit 19, and determines a focusing position using the phase difference AF processing unit 19.

Specifically, the phase difference AF processing unit 19 sets the value of the shift amount d when C1[$d$] becomes the minimum, calculated in step S2, or the value of the shift amount d when C2[$d$] becomes the minimum, calculated in step S3, as the phase difference amount, and determines the focusing position based on the phase difference amount. The system control unit 11 performs a focusing control of the imaging lens 1 according to the determined focusing position.

Further, the phase difference AF processing unit 19 may calculate an average of the value of the shift amount d when C1[$d$] becomes the minimum and the value of the shift amount d when C2[$d$] becomes the minimum, may set the average value as the phase difference amount, and may determine the focusing position based on the phase difference amount.

If $|M1-M2| > TH$ (step S4: YES), the system control unit 11 determines that the reliability of the focusing control based on the phase difference AF method is low, and performs a process of step S6.

In step S6, the system control unit 11 selects the contrast AF processing unit 18, and determines a focusing position using the contrast AF processing unit 18, and performs a focusing control of the imaging lens 1 according to the determined focusing position.

When there are plural pair lines in the selected AF area 53, the phase difference AF processing unit 19 performs the processes of steps S2 and S3 for each pair line. Further, the system control unit 11 compares |M1-M2| with the threshold value TH for each pair line.

In a case where there is at least one pair line where |M1-M2|> TH among the plural pair lines, the system control unit 11 determines that the reliability of the focusing control based on the phase difference AF method is low with respect to the selected AF area 53, and performs the contrast AF in step S6.

Further, when there is at least one pair line for which it is determined that |M1-M2|≤TH among the plural pair lines, the system control unit 11 determines that the reliability of the focusing control based on the phase difference AF method is high with respect to the selected AF area 53. In addition, the system control unit 11 performs the focusing control based on the phase difference AF method using detection signals of the phase difference detection pixels disposed in the pair line for which it is determined that |M1-M2|≤TH.

Here, when there are plural pair lines for which it is determined that |M1-M2|≤TH among the plural pair lines, the phase difference AF processing unit 19 may determine the focusing position based on an average of defocus amounts calculated for the respective pair lines, for example.

As described above, according to the digital camera shown in FIG. 1, it is possible to determine the reliability of the focusing control based on the phase difference AF method using only the detection signals of the phase difference detection pixels 52A and 52B, and thus, it is possible to perform the reliability determination at high speed. Further, it is possible to omit reading of detection signals of the imaging pixels in the reliability determination, and thus, it is possible to reduce power consumption.

Further, according to the digital camera shown in FIG. 1, in step S5, since the phase difference AF processing unit 19 can determine the focusing position using C1[$d$] and C2[$d$] which are previously calculated, it is possible to perform the phase difference AF at high speed.

In the above description, the system control unit 11 determines the reliability of the phase difference AF according to a magnitude relationship between |M1-M2| and the threshold value TH. As a modification example thereof, the system control unit 11 may calculate a ratio of M1 to M2 as a result of comparison between C1[$d$] and C2[$d$], and may determine the reliability of the phase difference AF according to a magnitude relationship between the ratio and the threshold value TH.

For example, when a larger value among M1 and M2 is represented as M1, the system control unit 11 may determine that the reliability of the phase difference AF is low if (M1/M2) exceeds the threshold value TH, and may determine that the reliability of the phase difference AF is high if (M1/M2) is equal to or smaller than the threshold value TH.

Further, in the above description, the system control unit 11 performs the contrast AF when it is determined that the reliability of the phase difference AF is low, but may notify a user that auto-focus is impossible to terminate the process without performing the contrast AF. With such a configuration, it is possible to prevent auto-focus from being executed in a state where the reliability of the phase difference AF is low, to thereby prevent imaging in an erroneous focused state.

If the AF area is enlarged, or if the number of pixel pairs used for the correlation operation increases, since the accuracy of the correlation operation becomes higher, there is a high possibility that the value of |M1-M2| becomes smaller. Thus, the system control unit 11 may control the above-described threshold value TH according to the AF area or the number of pairs of phase difference detection pixels used for the correlation operation. The system control unit 11 also functions as a threshold value control unit.

Specifically, as the AF area becomes larger, or as the number of pairs of the phase difference detection pixels used for the correlation operation increases, the threshold value TH may become smaller.

Hereinafter, a method of enhancing the accuracy of reliability determination of the focusing control based on the phase difference AF method will be described.

Figure 9A:
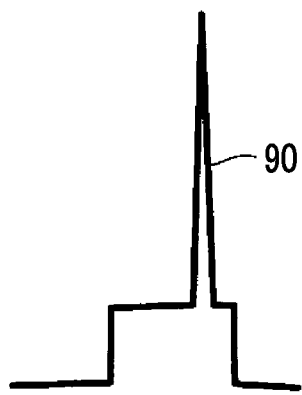
FIGS. 9A to 9D are diagrams illustrating a difference in output signal waveforms of the pixel pair P1 based on a difference between contrasts of subject images.
Figure 9B:

FIG. 9A is a diagram illustrating detection signals of the respective phase difference detection pixels 52A of the pixel pair P1 in a case where the contrast of a subject image formed in the pixel pair P1 is low. FIG. 9B is a diagram illustrating detection signals of the respective phase difference detection pixels 52B of the pixel pair P1 in a case where the contrast of the subject image formed in the pixel pair P1 is low.

Figure 9C:
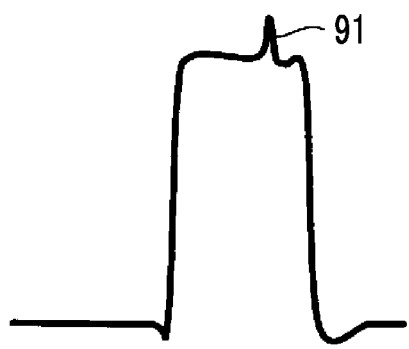
Figure 9D:
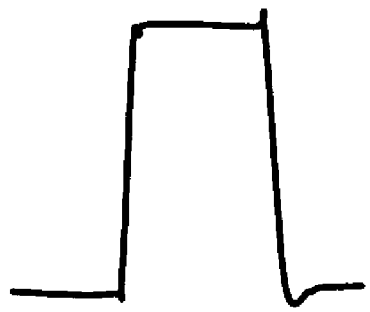

FIG. 9C is a diagram illustrating detection signals of the respective phase difference detection pixels 52A of the pixel pair P1 in a case where the contrast of the subject image formed in the pixel pair P1 is high. FIG. 9D is a diagram illustrating detection signals of the respective phase difference detection pixels 52B of the pixel pair P1 in a case where the contrast of the subject image formed in the pixel pair P1 is high.

FIG. 9 shows a case where a high frequency part is locally included in the subject image formed in the pixel pair P1. Thus, as shown in FIGS. 9A and 9C, parts 90 and 91 of which their levels are locally high are present in detection signal waveforms.

Figure 10A:
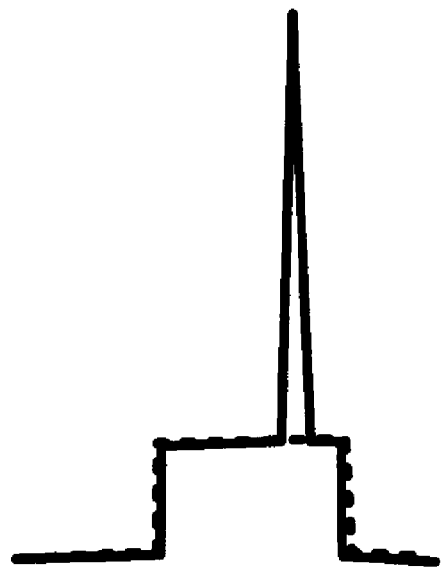
FIGS. 10A and 10B are diagrams illustrating a waveform positional relationship when a correlation amount becomes a minimum in the waveforms shown in FIGS. 9A to 9D.
Figure 10B:
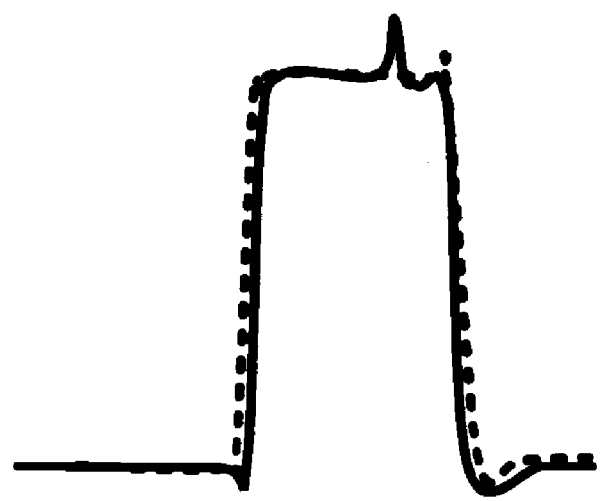

FIG. 10A is a diagram illustrating a state where a correlation amount between the waveform in FIG. 9A and the waveform in FIG. 9B becomes a minimum. FIG. 10B is a diagram illustrating a state where a correlation amount between the waveform in FIG. 9C and the waveform in FIG. 9D becomes a minimum.

Even if a difference is present in contrasts of subject images, in a state where the correlation amount becomes a minimum, a matching rate of low frequency parts that occupy most of the images becomes high. Thus, the magnitude of C1[$d$] in the state shown in FIG. 10A depends on the shape of the high frequency part 90, and the magnitude of C1[$d$] in the state shown in FIG. 10B depends on the shape of the high frequency part 91. Similarly, the magnitude of a minimum value of C2[$d$] with respect to the pixel pair P2 depends on the shape of a high frequency part.

Accordingly, even if a difference is present in contrasts of subject images, if a high frequency part is locally present in a subject image, a difference between a minimum value M1 of C1[$d$] and a minimum value M2 of C2[$d$] becomes a large value due to a difference between shapes of high frequency parts formed in the pixel pair P1 and the pixel pair P2. However, as shown in FIG. 9C, in a case where a high-contrast subject image is captured, although a high frequency part is included therein, since a difference between shapes of high frequency parts formed in the pixel pair P1 and the pixel pair P2 is small, the influence on the accuracy of the phase difference AF due to the high frequency parts is small.

Thus, the system control unit 11 calculates values corresponding to the contrasts of the subject images captured by the pixel pairs P1 and P2 from C1[$d$] and C2[$d$], and determines the reliability of the focusing control based on the phase difference AF method using the calculated values, the minimum value M1 of C1[$d$], and the minimum value M2 of C2[$d$].

Figure 11A:
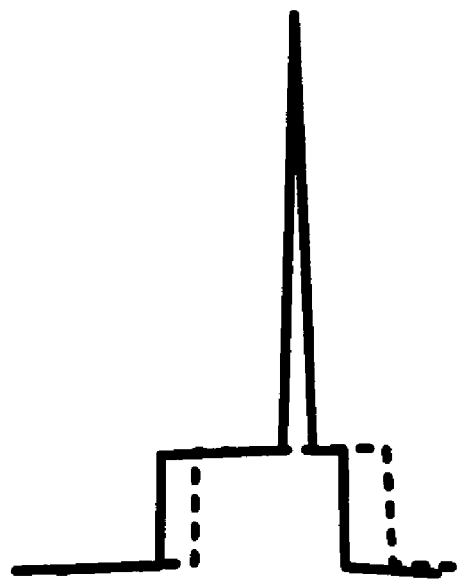
FIGS. 11A and 11B are diagrams illustrating a process of obtaining contrasts of subject images from a correlation operation result.
Figure 11B:
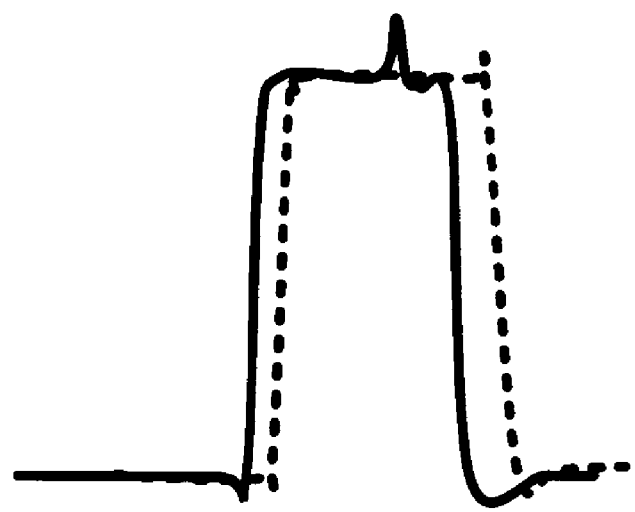

FIG. 11A is a diagram illustrating a state where the detection signal waveform of the respective phase difference detection pixels 52B of the pixel pair P1 are slightly shifted to the right from the state shown in FIG. 10A. FIG. 11B is a diagram illustrating a state where the detection signal waveform of the respective phase difference detection pixels 52B of the pixel pair P1 are slightly shifted to the right from the state shown in FIG. 10B.

A difference between an area surrounded by a solid line waveform and a broken line waveform shown in FIG. 11A and an area surround by a solid line waveform and a broken line waveform shown in FIG. 10A becomes a value in which the level of a low frequency part is reflected, which becomes a small value. Further, a difference between an area surrounded by a solid line waveform and a broken line waveform shown in FIG. 11B and an area surround by a solid line waveform and a broken line waveform shown in FIG. 10B becomes a value in which the level of a low frequency part is reflected, which becomes a large value. Accordingly, it is possible to determine the height of the contrast of a subject image according to the magnitude of a difference between a value of C1[$d$] in the state shown in FIGS. 10A and 10B and a value of C1[$d$] in the state shown in FIGS. 11A and 11B.

When a value obtained by adding or subtracting an arbitrary numerical value (for example, one pixel which is a minimum unit of the shift amount d) to or from a value of the shift amount d when C1[$d$] becomes a minimum value is represented as da, the system control unit 11 calculates a difference Δ1 between C1[$d$=da] and the minimum value M1 of C1[$d$]. Further, when a value obtained by adding or subtracting the arbitrary numerical value to or from a value of the shift amount d when C2[$d$] becomes a minimum value is represented as daa, the system control unit 11 calculates a difference 42 between C2[$d$=daa] and the minimum value M2 of C2[$d$].

Here, Δ1 becomes a numerical value corresponding to the contrast of the subject image captured by the pixel pairs P1, and 42 becomes a numerical value corresponding to the contrast of the subject image captured by the pixel pairs P2. Accordingly, an average value of Δ1 and Δ2 represents the contrast of the subject image captured by the pair line including the pixel pairs P1 and the pixel pairs P2.

Instead, Δ1 and Δ2 may be inclinations of correlation values in the vicinity of the minimum values of the correlation value C1[$d$] and the correlation value C2[$d$]. As the inclination becomes larger, the contrast becomes larger. Further, a value corresponding to the contrast may be calculated using signals of imaging pixel signals. In the AF area 53, a difference between signals may be calculated in adjacent imaging pixels, and a value obtained by adding up the differences in the AF area may be set as the value corresponding to the contrast.

Even if |M1-M2| exceeds the threshold value TH, when the contrast of the subject image captured by the pair line is high, the system control unit 11 performs reliability determination by comparing {|M1-M2|/(average value of Δ1 and Δ2)} with the threshold value TH so that it is possible to determine that the reliability of the focusing control based on the phase difference AF is high.

The value of {|M1-M2|/(average value of Δ1 and Δ2)} becomes a smaller value as the value of (average value of Δ1 and Δ2) corresponding to the contrast becomes larger. Thus, even in a situation where |M1-M2| exceeds the threshold value TH through the comparison between {|M1-M2|/(average value of Δ1 and Δ2)} and threshold value TH, it is possible to determine that the reliability of the phase difference AF is high in a case where the contrast of the subject image is high. That is, by performing reliability determination through comparison between a value obtained by processing |M1-M2| using Δ1 and Δ2 and the threshold value TH, it is possible to enhance the accuracy of reliability determination.

Figure 12:
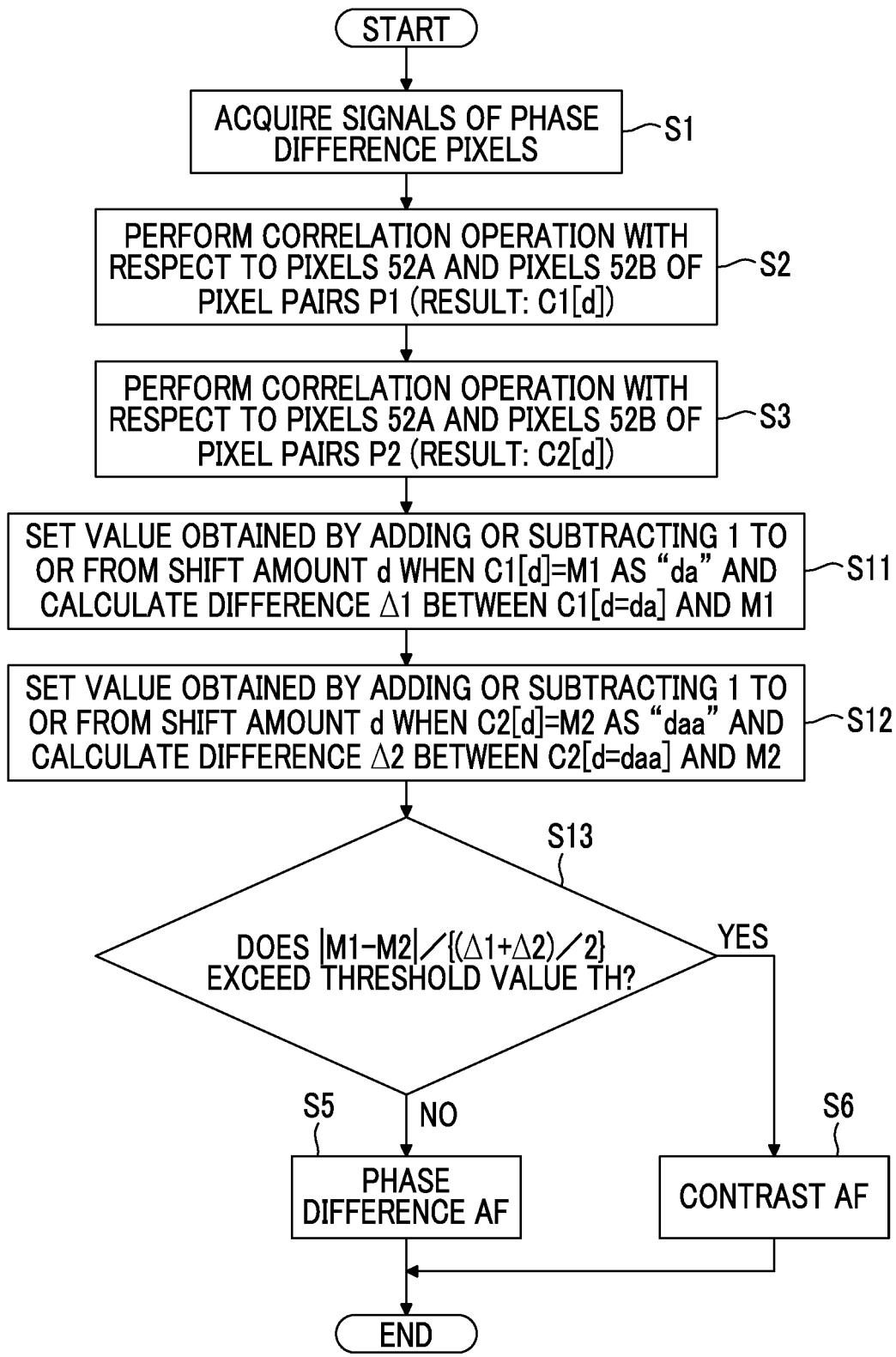
FIG. 12 is a flowchart illustrating a modification example of the auto-focus operation of the digital camera shown in FIG. 1.

FIG. 12 is a flowchart illustrating a modification example of the auto-focus operation of the digital camera shown in FIG. 1. In FIG. 12, the same reference numerals are given to the same processes as in FIG. 8, and description thereof will not be repeated.

After step S3, the system control unit 11 sets a value obtained by adding or subtracting 1 to or from the shift amount d when C1[$d$]=M1 as "da", and calculates the difference Δ1 between C1[$d$=da] and M1 (step S11).

Further, the system control unit 11 sets a value obtained by adding or subtracting 1 to or from the shift amount d when C2[$d$]=M2 as "daa", and calculates the difference Δ2 between C2[$d$=daa] and M2 (step S12).

Then, the system control unit 11 determines whether the value obtained by dividing |M1-M2| by an average value of Δ1 and Δ2 exceeds the threshold value TH (step S13).

When the determination in step S13 is YES, the system control unit 11 determines that the reliability of the focusing control based on the phase difference AF method is low, and performs the process of step S6. When the determination in step S13 is NO, the system control unit 11 determines that the reliability of the focusing control based on the phase difference AF method is high, and performs the process of step S5.

As described above, by performing reliability determination of the focusing control based on the phase difference AF method using the minimum value M1 of C1[$d$], the minimum value M2 of C2[$d$], the Δ1 and Δ2 corresponding to the contrasts, even if a high frequency part is present, it is possible to determine that the reliability is high in the case shown in FIG. 10B, to thereby enhance the accuracy of reliability determination.

Figure 13:
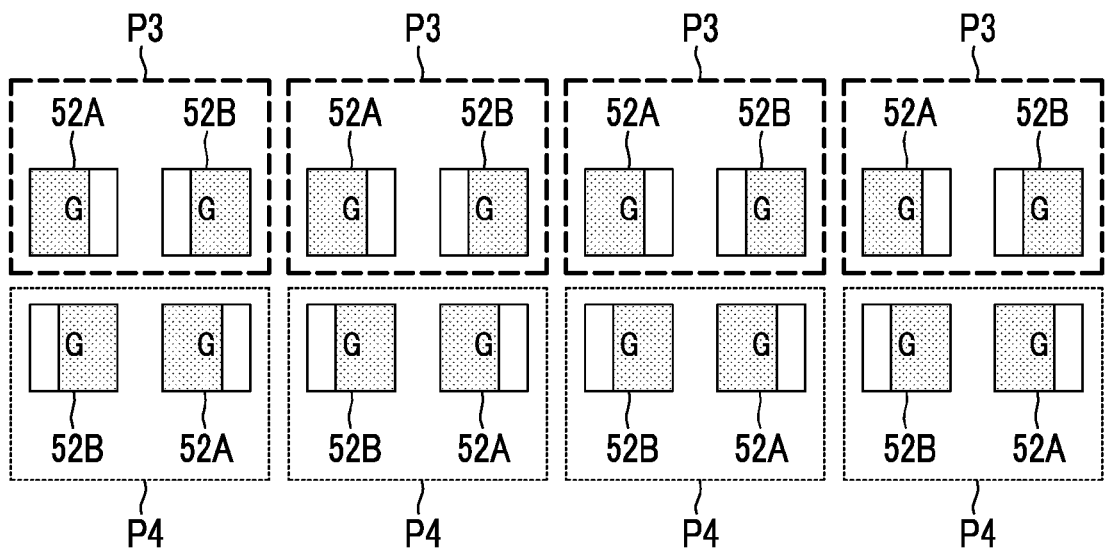
FIG. 13 is a diagram illustrating a modification example of pixel pairs set in a pair line.

Hereinbefore, the pair line disposed in the AF area 53 is described as a line including the pixel pairs P1 and the pixel pairs P2, but as shown in FIG. 13, it may also be said that the pair line is a line including pixel pairs P3 and pixel pairs P4.

That is, the pair line may be configured to include a line in which the pixel pairs P3 including the phase difference detection pixel 52A and the phase difference detection pixel 52B which is disposed to be spaced from the phase difference detection pixel 52A at a predetermined distance in the phase difference detection direction (row direction X) are arranged in the row direction X and a line in which the pixel pairs P4 having a reverse positional relationship with respect to the positional relationship of the phase difference detection pixel 52A and the phase difference detection pixel 52B in the pixel pair P3 are arranged in the X direction.

In a case where the pixel pairs P3 and P4 are set in the pair line as shown in FIG. 13, the phase difference AF processing unit 19 performs a correlation operation with respect to detection signal groups of the phase difference detection pixels 52A and 52B of the pixel pair P3, in step S2 of FIG. 8, and performs a correlation operation with respect to detection signal groups of the phase difference detection pixels 52A and 52B of the pixel pair P4, in step S3 of FIG. 8.

Even in a case where the pixel pairs are set as described above, since the pixel pairs 3 and the pixel pairs 4 capture approximately the same subject images, it is possible to achieve the same effects as in the digital camera shown in FIG. 1.

Hereinafter, a modification example of the array of the phase difference detection pixels which are disposed in the AF area 53 of the imaging element 5 will be described.

First Modification Example of Array

Figure 14:
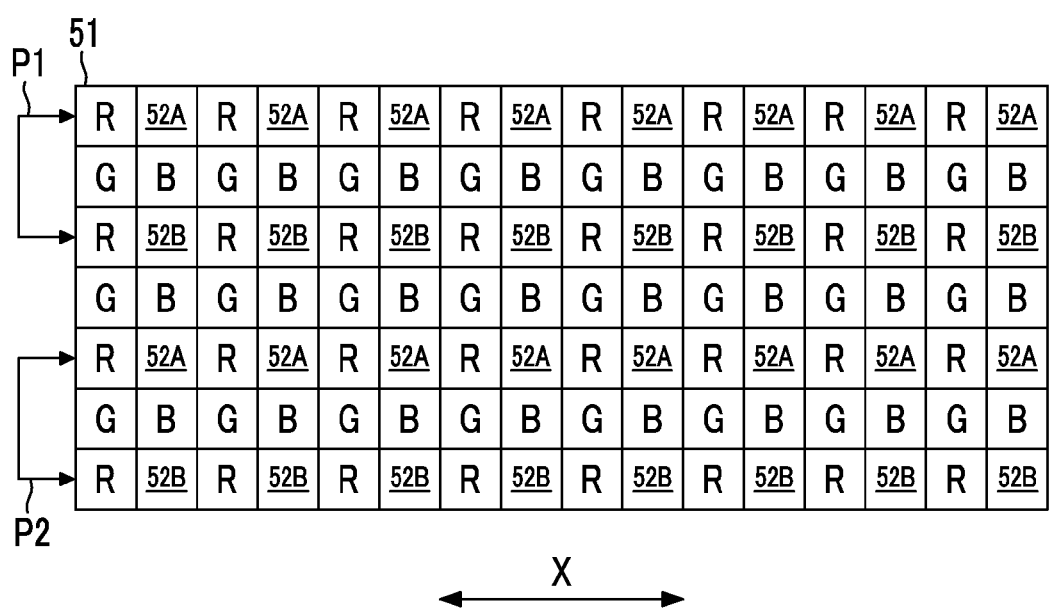
FIG. 14 is a diagram illustrating a modification example of an array of phase difference detection pixels 52A and 52B disposed at the AF area 53 of the imaging element 5 shown in FIG. 1.

FIG. 14 is a diagram illustrating a modification example of the array of the phase difference detection pixels 52A and 52B which are disposed in the AF area 53 of the imaging element 5 shown in FIG. 1.

In the array example shown in FIG. 14, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as a pair line. In the pair line, the pixels disposed at the same position in the row direction X are all disposed at such close positions as to receive a beam from the same subject portion.

In the pair line shown in FIG. 14, respective phase difference detection pixels included in phase difference pixel lines in odd-numbered rows are the phase difference detection pixels 52A, and respective phase difference detection pixels included in phase difference pixel lines in even-numbered rows are the phase difference detection pixels 52B.

In the array example shown in FIG. 14, each phase difference detection pixel 52A in the phase difference pixel line in the first row in the pair line and each phase difference detection pixel 52B disposed at a one-pixel interval with respect to each phase difference detection pixel 52A in a downward direction form a pixel pair P1.

Further, each phase difference detection pixel 52A in the phase difference pixel line in the third-row in the pair line and each phase difference detection pixel 52B disposed at a one-pixel interval with respect to each phase difference detection pixel 52A in the downward direction form a pixel pair P2.

According to the array example shown in FIG. 14, since the array is a generally used array of phase difference detection pixels, it is possible to easily apply the array to an existing imaging element with high versatility.

Second Modification Example of Array

Figure 15:
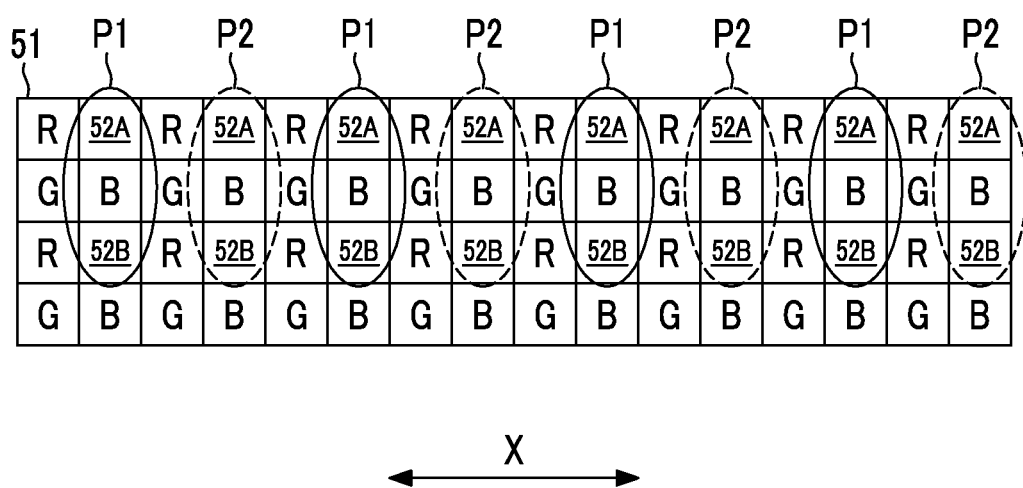
FIG. 15 is a diagram illustrating another modification example of the array of the phase difference detection pixels 52A and 52B disposed at the AF area 53 of the imaging element 5 shown in FIG. 1.

FIG. 15 is a diagram illustrating a modification example of the array of the phase difference detection pixels 52A and 52B which are disposed in the AF area 53 of the imaging element 5 shown in FIG. 1.

In the array example shown in FIG. 15, one phase difference pixel line that includes plural phase difference detection pixels 52B arranged in the row direction X, and one phase difference pixel line that includes plural phase difference detection pixels 52A arranged in the row direction X are provided in the AF area 53, and reliability determination is performed using the two phase difference pixel lines as a pair line. In the pair line, the pixels disposed at the same position in the row direction X are all disposed at such close positions as to receive a beam from the same subject.

In the array example shown in FIG. 15, the phase difference detection pixel 52A and the phase difference detection pixel 52B disposed in an odd-numbered column in each phase difference pixel line form a pixel pair P1.

Further, the phase difference detection pixel 52A and the phase difference detection pixel 52B disposed in an even-numbered column in each phase difference pixel line form a pixel pair P2.

According to the array example shown in FIG. 15, since the array is a generally used array of phase difference detection pixels, it is possible to easily apply the array to an existing imaging element with high versatility.

In the example shown in FIG. 15, when it is determined that the reliability of the focusing control based on the phase difference AF method is high, the phase difference AF processing unit 19 performs a correlation operation using a detection signal group of the phase difference pixel line including the phase difference detection pixels 52A and a detection signal group of the phase difference pixel line including the phase difference detection pixels 52B to determine a focusing position.

In the array examples shown in FIGS. 14 and 15, in each phase difference pixel line, an arrangement pitch of the phase difference detection pixels 52A and 52B is smaller than that in the array example shown in FIG. 4. Thus, an array is obtained strong against a high frequency subject compared with the array example shown in FIG. 4. In a case where an interval of the phase difference pixel lines is distant, if there is a high frequency subject, the accuracy of the phase difference AF may deteriorate, thereby the invention is effective.

Third Modification Example of Array

Figure 16:
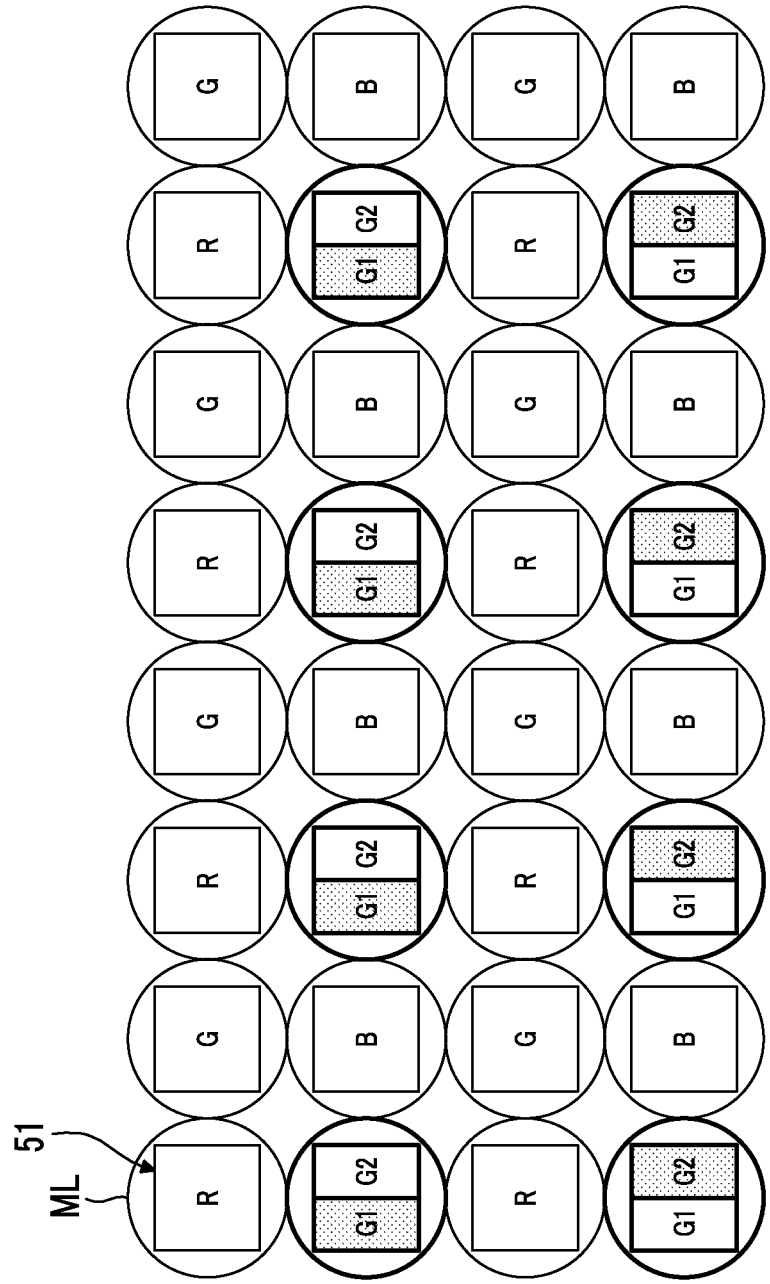
FIG. 16 is a diagram illustrating a modification example of a configuration of the AF area 53 of the imaging element 5 shown in FIG. 1.

FIG. 16 is a diagram illustrating a modification example of the array of pixels which are disposed at the AF area 53 of the imaging element 5 shown in FIG. 1.

In the array example shown in FIG. 16, a photoelectric conversion portion of a part of G pixels 51 disposed in the AF area 53 is divided into two parts, in which the left part ("G1" pixel) among the two-divided parts of the photoelectric conversion portion is set as the phase difference detection pixel 52A, and the right part ("G2" pixel) among the two-divided pixels is set as the phase difference detection pixel 52B.

One micro lens 51 is provided in each pixel 51, and one micro lens 51 is also provided over the phase difference detection pixel 52A and the phase difference detection pixel 52B obtained by dividing the photoelectric conversion portion of one pixel 51 into two parts.

Thus, a configuration in which the phase difference detection pixel 52A receives a beam that passes through a half of a pupil region of the imaging lens 1 and the phase difference detection pixel 52B receives a beam that passes through the remaining half of the pupil region of the imaging lens 1 is obtained.

In this array example, two phase difference pixel lines where the pixels 51 that include the phase difference detection pixel 52A and the phase difference detection pixel 52B are arranged in the row direction X are provided in the column direction Y, in the AF area 53, and the reliability determination is performed using the two phase difference pixel lines as a pair line. In the pair line, the micro lenses ML disposed at the same position in the row direction X are all disposed at such close positions as to receive a beam from the same subject.

In the array example shown in FIG. 16, each phase difference detection pixel 52A (shaded pixel in the figure) in the phase difference pixel line in the first row and the phase difference detection pixel 52B (shaded pixel in the figure) in the phase difference pixel line in the second row disposed on a diagonally lower right side with respect to each phase difference detection pixel 52A are set as a pixel pair P1.

Further, each phase difference detection pixel 52A (non-shaded pixel in the figure) in the phase difference pixel line in the second row and the phase difference detection pixel 52B (non-shaded pixel in the figure) in the phase difference pixel line in the first row disposed on a diagonally upper right side with respect to each phase difference detection pixel 52A are set as a pixel pair P2.

In the array shown in FIG. 16, in a case where the pixel 51 divided into the phase difference detection pixel 52A and the phase difference detection pixel 52B is used as an imaging pixel, a signal obtained by adding a detection signal of the phase difference detection pixel 52A to a detection signal of the phase difference detection pixel 52B may be considered as a signal output from the pixel 51.

Further, in the array shown in FIG. 16, a configuration in which all the pixels 51, instead of a part of the G pixels 51, are divided into two parts may be used. In this configuration, it is possible to perform reliability determination for each color, and to perform the phase difference AF using phase difference detection pixels of colors for which high reliability is obtained. Thus, it is possible to increase a possibility that the phase difference AF is performed, or to enhance the accuracy of the phase difference AF.

According to the array example shown in FIG. 16, since a configuration in which the phase difference detection pixel 52A and the phase difference detection pixel 52B are provided under one micro lens ML is used, it is possible to increase the number of imaging pixels, compared with a configuration in which the micro lens ML is individually provided for the phase difference detection pixel 52A and the phase difference detection pixel 52B. Further, in imaging, since signals from the phase difference detection pixel 52A and the phase difference detection pixel 52B disposed at the approximately the same position are added to obtain a signal corresponding to one pixel, a pixel interpolation process is not necessary, to thereby make it possible to enhance the quality of a captured image.

In a configuration in which all the pixels 51 are divided into two parts, since the arrangement pitch of the phase difference detection pixels decreases in the longitudinal direction and in the transverse direction, the configuration provides an array strong against a high frequency subject. In a case where signals from two divided pixels may not simultaneously read out, since there is a possibility that the reliability of the phase difference AF with respect to a high frequency subject is reduced, the invention is effective.

In this description, an example in which the digital camera is used as the imaging device is shown, but hereinafter, an embodiment in which a smart phone with a camera is used as the imaging device will be described.

Figure 17:
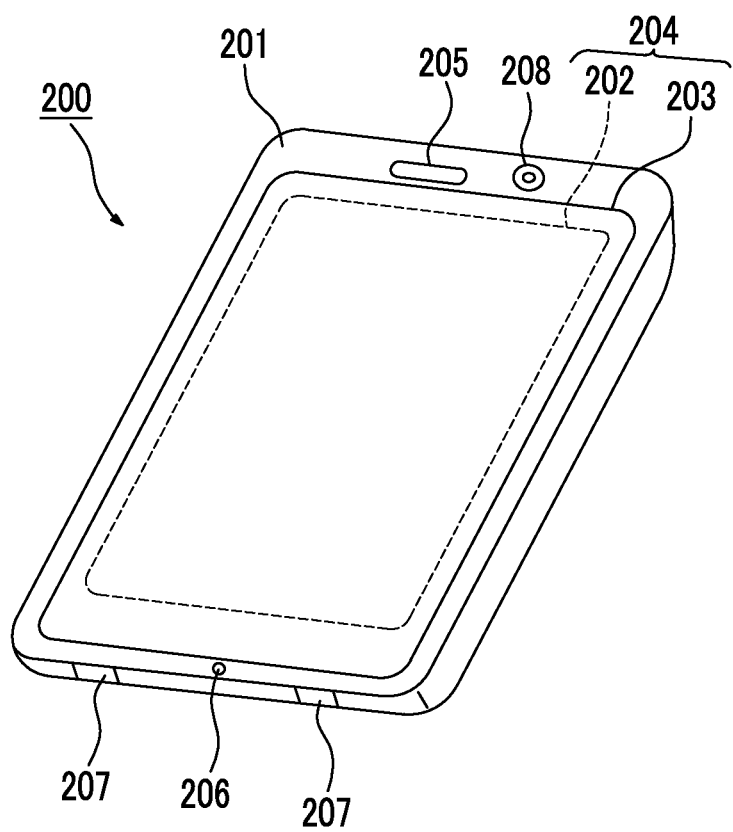
FIG. 17 is a diagram illustrating a smart phone which is an imaging device.

FIG. 17 is a diagram illustrating an appearance of a smart phone 200 which is an embodiment of the imaging device of the invention. The smart phone 200 shown in FIG. 17 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 18:
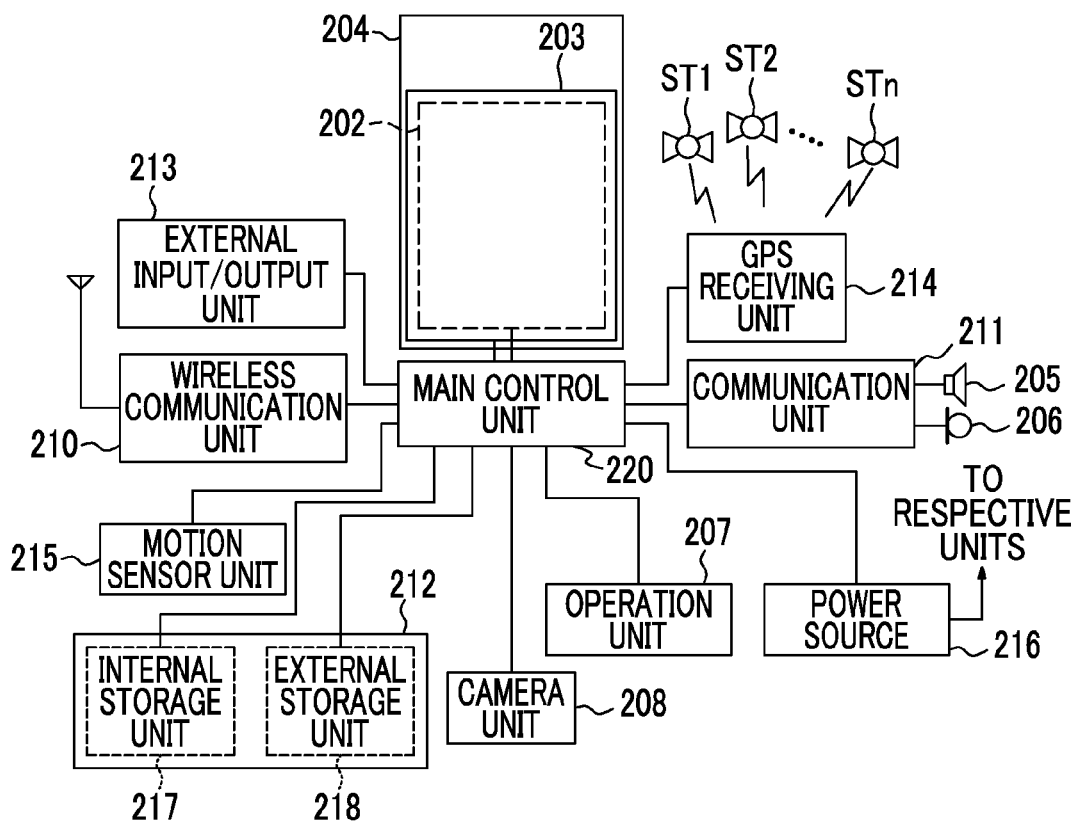
FIG. 18 is an internal block diagram illustrating the smart phone shown in FIG. 17.

FIG. 18 is a block diagram illustrating a configuration of the smart phone 200 shown in FIG. 17. As shown in FIG. 17, as main components of the smart phone, a wireless communication unit 210, the display input unit 204, a communication unit 211, the operation unit 207, the camera unit 208, a storage unit 212, and an external input/output unit 213, a global positioning system (GPS) receiving unit 214, a motion sensor unit 215, a power source 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 17, the display panel 202 and the operation panel 203 of the smart phone 200 shown as an example of the imaging device of the invention are integrated to form the display input unit 204, in which the operation panel 203 is arranged to completely cover the display panel 202.

When such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 17, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 17, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable and attachably memory slot. Each of the respective internal storage section 217 and the external storage section 218 that form the storage unit 212 is realized using a storage medium such as a flash memory, a hard disk type memory, a multimedia card micro type memory, a card type memory (for example, Micro SD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module (SIM) card or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including a latitude, a longitude and an altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 comprises a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, and the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 17, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. Further, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a static image or a video image, and the result may be stored in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIG. 8 in the main control unit 220, it is possible to perform the phase difference AF at high speed with high accuracy.

As described above, this specification discloses the following content.

According to the disclosure, an imaging device includes: an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a focusing control unit that performs a focusing control for the imaging optical system based on a phase difference AF method using a phase difference obtained with a detection signal of the first signal detection unit and a detection signal of the second signal detection unit; a correlation operation unit that performs a correlation operation with respect to detection signal groups in first pairs that include a first signal detection unit group including the plurality of the first signal detection unit which are arranged at an arbitrary pitch in a phase difference detection direction and a second signal detection unit group including the plurality of the second signal detection unit which are arranged at the same distance in the same direction with respect to each of the first signal detection units that form the first signal detection unit group and performs a correlation operation with respect to detection signal groups in second pairs that include a third signal detection unit group including the plurality of first signal detection units which are arranged at the same distance in the same direction with respect to each of the first signal detection units that form the first signal detection unit group and are arranged in the detection direction and a fourth signal detection unit group including the plurality of second signal detection units which are arranged at the same distance in the same direction with respect to each of the first signal detection units that form the third signal detection unit group; a reliability determination unit that determines a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a phase difference AF determination unit that determines whether to perform the focusing control based on the phase difference AF method based on a determination result in the reliability determination unit.

In the above imaging device, the reliability determination units may determine the reliability of the focusing control based on the phase difference AF method by comparing a difference between the first correlation amount and the second correlation amount or a ratio between the first correlation amount and the second correlation amount with a threshold value.

In the above imaging device, the reliability determination units may calculate a value corresponding to a first contrast of a subject image captured by the first pairs using the correlation operation result with respect to the first pairs, may calculate a value corresponding to a second contrast of a subject image captured by the second pairs using the correlation operation result with respect to the second pairs, and may determine the reliability of the focusing control based on the phase difference AF method using the result of the comparison between the first correlation amount and the second correlation amount and using the value corresponding to the first contrast and the value corresponding to the second contrast.

In the above imaging device, the reliability determination units may determine the reliability of the focusing control based on the phase difference AF method through magnitude comparison between a value obtained by calculating a difference between the first correlation amount and the second correlation amount or a ratio between the first correlation amount and the second correlation amount according to the value corresponding to the first contrast and the value corresponding to the second contrast and a threshold.

In the above imaging device, the correlation operation unit may calculate a correlation amount between the detection signal groups in the first pairs while shifting a detection signal group of the first signal detection unit group and a detection signal group of the second signal detection unit group by an arbitrary amount in the detection direction, and may calculate a correlation amount between the detection signal groups in the second pairs while shifting a detection signal group of the third signal detection unit group and a detection signal group of the fourth signal detection unit group by an arbitrary amount in the detection direction, and the reliability determination unit may calculate, as the value corresponding to the first contrast, a difference between the first correlation amount and the correlation amount between the detection signal groups in the first pairs in a shift amount obtained by adding or subtracting the arbitrary amount to or from a shift amount between the detection signal group of the first signal detection unit group and the detection signal group of the second signal detection unit group when the first correlation amount is obtained, and may calculate, as the value corresponding to the second contrast, a difference between the second correlation amount and the correlation amount between the detection signal groups in the second pairs in a shift amount obtained by adding or subtracting the arbitrary amount to or from a shift amount between the detection signal group of the third signal detection unit group and the detection signal group of the fourth signal detection unit group when the second correlation amount is obtained.

The above imaging device may further includes a threshold value control unit that controls the threshold value.

According to the disclosure, a focusing control method includes: a focusing control step of performing a focusing control for an imaging optical system based on a phase difference AF method using a phase difference obtained with a detection signal of a first signal detection unit and a detection signal of a second signal detection unit output from an imaging element that includes the first signal detection unit that detects a signal corresponding to one beam among a pair of beams that passes through different portions in a pupil region of the imaging optical system and the second signal detection unit that detects a signal corresponding to the other beam among the pair of beams and images a subject through the imaging optical system; a correlation operation step of performing a correlation operation with respect to detection signal groups in first pairs that include a first signal detection unit group including the plurality of the first signal detection unit which are arranged at an arbitrary pitch in a phase difference detection direction and a second signal detection unit group including the plurality of the second signal detection unit which are arranged at the same distance in the same direction with respect to each of the first signal detection units that form the first signal detection unit group and performing a correlation operation with respect to detection signal groups in second pairs that include a third signal detection unit group including the plurality of first signal detection units which are arranged at the same distance in the same direction with respect to each of the first signal detection units that form the first signal detection unit group and are arranged at the arbitrary pitch in the detection direction and a fourth signal detection unit group including the plurality of second signal detection units which are arranged at the same distance in the same direction with respect to each of the first signal detection units that form the third signal detection unit group; a reliability determination step of determining a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a determination step of determining whether to perform the focusing control by the phase difference AF method based on a determination result in the reliability determination step.

INDUSTRIAL APPLICABILITY

The present invention is applied to a digital camera or the like to provide high convenience and effectiveness.

EXPLANATION OF REFERENCES

1: imaging lens
2: diaphragm
5: imaging element
11: system control unit
18: contrast AF processing unit
19: phase difference AF processing unit
50: light receiving surface
51: pixel
52, 52A, 52B: phase difference detection pixel
53: AF area
P1, P2: pixel pair

What is claimed is:
1. An imaging device comprising:
an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system;
a focusing control unit that performs a focusing control for the imaging optical system based on a phase difference AF method using a phase difference obtained with a detection signal of the first signal detection unit and a detection signal of the second signal detection unit;
a correlation operation unit that performs a correlation operation with respect to detection signal groups in first pairs that include a first signal detection unit group including a plurality of the first signal detection units included in the imaging element which are arranged at an arbitrary pitch in a phase difference detection direction and a second signal detection unit group including a plurality of the second signal detection units included in the imaging element which are arranged at the same distance in the same direction with respect to each of the first signal detection units that form the first signal detection unit group and performs a correlation operation with respect to detection signal groups in second pairs that include a third signal detection unit group including a plurality of the first signal detection units included in the imaging element which are arranged at the same distance in the same direction with respect to each of the first signal detection units that form the first signal detection unit group and are arranged in the detection direction and a fourth signal detection unit group including a plurality of the second signal detection units included in the imaging element which are arranged at the same distance in the same direction with respect to each of the first signal detection units that form the third signal detection unit group;

a reliability determination unit that determines a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a phase difference AF determination unit that determines whether to perform the focusing control based on the phase difference AF method based on a determination result in the reliability determination unit.

2. The imaging device according to claim 1, wherein the reliability determination units determines the reliability of the focusing control based on the phase difference AF method by comparing a difference between the first correlation amount and the second correlation amount or a ratio between the first correlation amount and the second correlation amount with a threshold value.

3. The imaging device according to claim 1, wherein the reliability determination units calculates a value corresponding to a first contrast of a subject image captured by the first pairs using the correlation operation result with respect to the first pairs, calculates a value corresponding to a second contrast of a subject image captured by the second pairs using the correlation operation result with respect to the second pairs, and determines the reliability of the focusing control based on the phase difference AF method using the result of the comparison between the first correlation amount and the second correlation amount and using the value corresponding to the first contrast and the value corresponding to the second contrast.

4. The imaging device according to claim 3, wherein the reliability determination units determines the reliability of the focusing control based on the phase difference AF method through magnitude comparison between a value obtained by calculating a difference between the first correlation amount and the second correlation amount or a ratio between the first correlation amount and the second correlation amount according to the value corresponding to the first contrast and the value corresponding to the second contrast and a threshold.

5. The imaging device according to claim 3, wherein the correlation operation unit calculates a correlation amount between the detection signal groups in the first pairs while shifting a detection signal group of the first signal detection unit group and a detection signal group of the second signal detection unit group by an arbitrary amount in the detection direction, and calculates a correlation amount between the detection signal groups in the second pairs while shifting a detection signal group of the third signal detection unit group and a detection signal group of the fourth signal detection unit group by an arbitrary amount in the detection direction, and wherein the reliability determination unit calculates, as the value corresponding to the first contrast, a difference between the first correlation amount and the correlation amount between the detection signal groups in the first pairs in a shift amount obtained by adding or subtracting the arbitrary amount to or from a shift amount between the detection signal group of the first signal detection unit group and the detection signal group of the second signal detection unit group when the first correlation amount is obtained, and calculates, as the value corresponding to the second contrast, a difference between the second correlation amount and the correlation amount between the detection signal groups in the second pairs in a shift amount obtained by adding or subtracting the arbitrary amount to or from a shift amount between the detection signal group of the third signal detection unit group and the detection signal group of the fourth signal detection unit group when the second correlation amount is obtained.

6. The imaging device according to claim 4, wherein the correlation operation unit calculates a correlation amount between the detection signal groups in the first pairs while shifting a detection signal group of the first signal detection unit group and a detection signal group of the second signal detection unit group by an arbitrary amount in the detection direction, and calculates a correlation amount between the detection signal groups in the second pairs while shifting a detection signal group of the third signal detection unit group and a detection signal group of the fourth signal detection unit group by an arbitrary amount in the detection direction, and wherein the reliability determination unit calculates, as the value corresponding to the first contrast, a difference between the first correlation amount and the correlation amount between the detection signal groups in the first pairs in a shift amount obtained by adding or subtracting the arbitrary amount to or from a shift amount between the detection signal group of the first signal detection unit group and the detection signal group of the second signal detection unit group when the first correlation amount is obtained, and calculates, as the value corresponding to the second contrast, a difference between the second correlation amount and the correlation amount between the detection signal groups in the second pairs in a shift amount obtained by adding or subtracting the arbitrary amount to or from a shift amount between the detection signal group of the third signal detection unit group and the detection signal group of the fourth signal detection unit group when the second correlation amount is obtained.

7. The imaging device according to claim 2, further comprising:

a threshold value control unit that controls the threshold value.

8. The imaging device according to claim 4, further comprising:

a threshold value control unit that controls the threshold value.

9. A focusing control method comprising:

a focusing control step of performing a focusing control for an imaging optical system based on a phase difference AF method using a phase difference obtained with a detection signal of a first signal detection unit and a detection signal of a second signal detection unit output from an imaging element that includes the first signal detection unit that detects a signal corresponding to one beam among a pair of beams that passes through different portions in a pupil region of the imaging optical system and the second signal detection unit that detects a signal corresponding to the other beam among the pair of beams and images a subject through the imaging optical system;

a correlation operation step of performing a correlation operation with respect to detection signal groups in first pairs that include a first signal detection unit group including a plurality of the first signal detection units included in the imaging element which are arranged at an arbitrary pitch in a phase difference detection direction and a second signal detection unit group including a plurality of the second signal detection units included in the imaging element which are arranged at the same distance in the same direction with respect to each of the first signal detection units that form the first signal detection unit group and performing a correlation operation with respect to detection signal groups in second pairs that include a third signal detection unit group including a plurality of first signal detection units included in the imaging element which are arranged at the same distance in the same direction with respect to each of the first signal detection units that form the first signal detection unit group and are arranged at the arbitrary pitch in the detection direction and a fourth signal detection unit group including a plurality of second signal detection units included in the imaging element which are arranged at the same distance in the same direction with respect to each of the first signal detection units that form the third signal detection unit group;

a reliability determination step of determining a reliability of the focusing control based on the phase difference AF method using the detection signal of each signal detection unit in the respective first pairs and second pairs, using at least a result of comparison between a first correlation amount which is a minimum correlation amount between detection signal groups in the first pairs, among the obtained results of the correlation operation with respect to the first pairs, and a second correlation amount which is a minimum correlation amount between detection signal groups in the second pairs, among the obtained results of the correlation operation with respect to the second pairs; and a determination step of determining whether to perform the focusing control by the phase difference AF method based on a determination result in the reliability determination step.

* * * * *